UNITED STATES PATENT OFFICE.

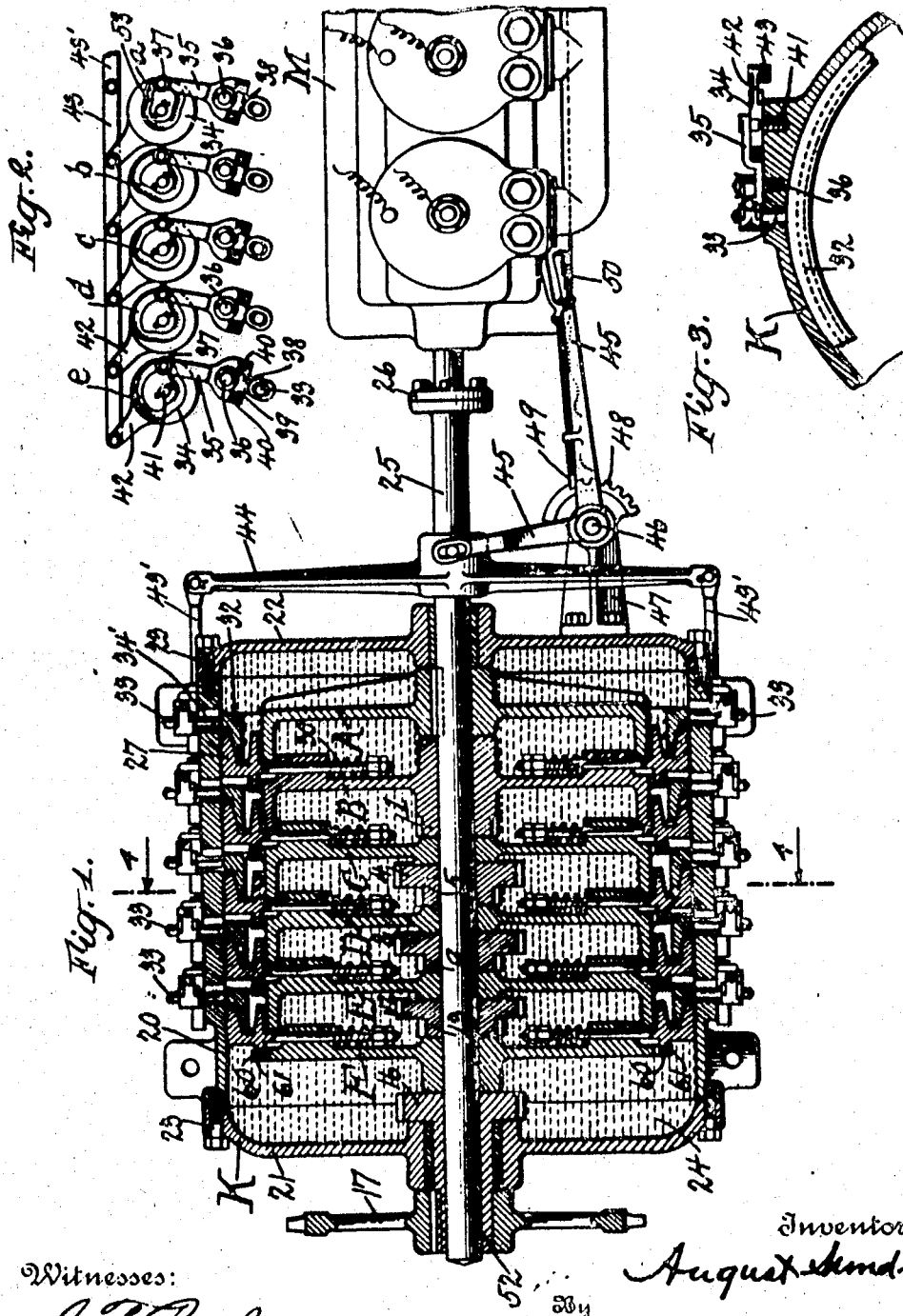

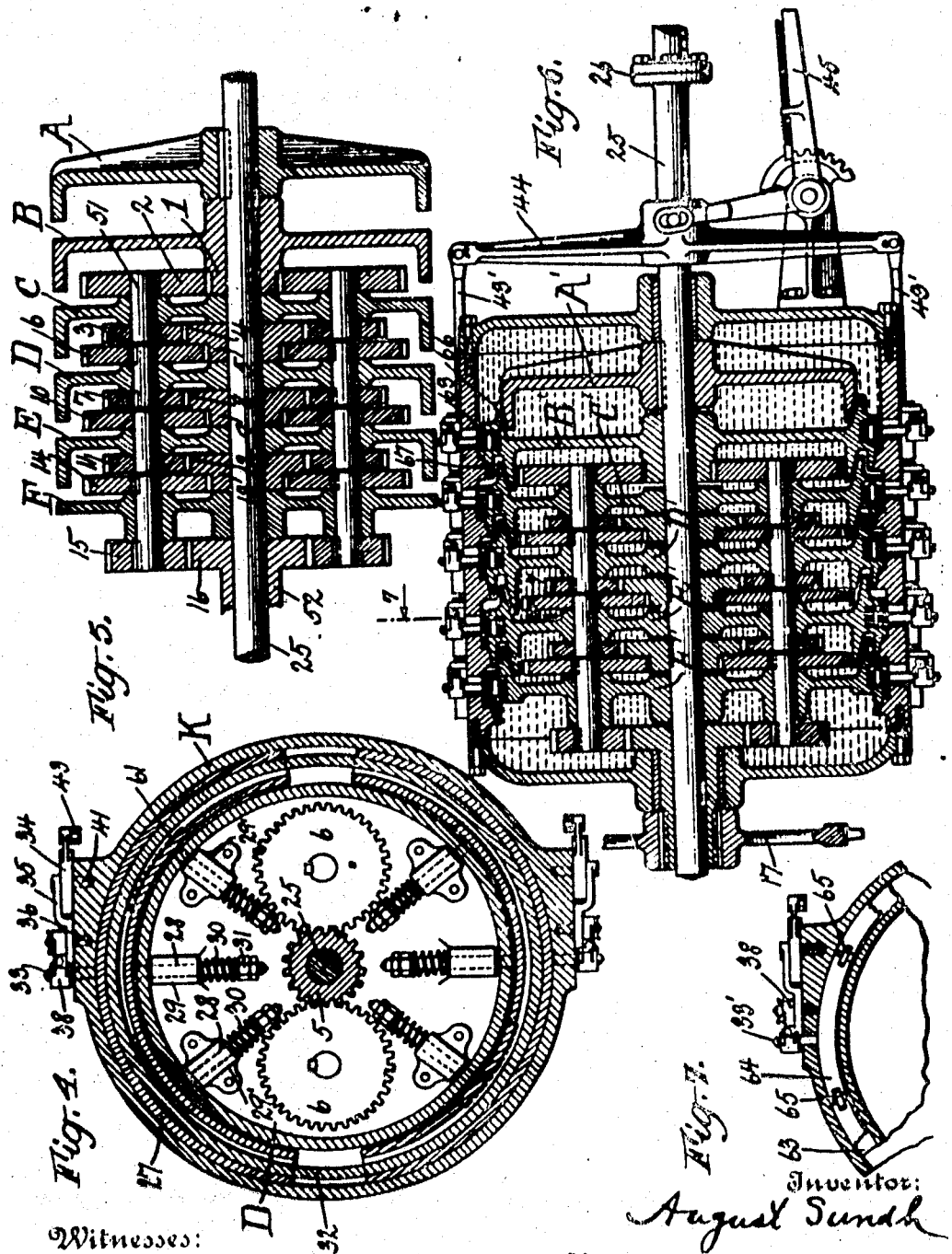

AUGUST SUNDH, OF YONKERS, NEW YORK.

MECHANICALLY-CONTROLLED POWER-TRANSMITTING MECHANISM.

983,950.  Specification of Letters Patent.  Patented Feb. 14, 1911.

Application filed May 11, 1910.  Serial No. 560,570.

*To all whom it may concern:*

Be it known that I, AUGUST SUNDH, a citizen of the United States, residing at Yonkers, in the county of Westchester and State of New York, have invented a new and useful Improvement in Mechanically-Controlled Power-Transmitting Mechanism, of which the following is a specification.

The present invention relates to mechanically controlled power transmission mechanism, and is a modification of the invention disclosed in my co-pending applications Serial No. 511,382, for mechanically controlled power transmission mechanism, and Patent No. 963,092, July 5, 1910, Serial No. 511,383, for fluid controlled power transmission mechanism, both filed August 5, 1909.

The invention comprises a train of intermeshing spur gear wheels for transmitting power from a prime mover to a driven member. Certain of said gears are carried by disks or rotary members mounted for rotation about a common axis. A series of clutches is provided for holding said disks either stationary or for connecting them for rotation about said axis.

An object of the present invention is to provide simple, efficient and practical mechanism for mechanically operating the clutches in succession and thereby modifying the relative movement of the train of gears to effect a gradual variation in the speed of the driven mechanism.

Other objects of the invention will appear hereinafter.

In the accompanying drawings, Figure 1 is a sectional plan view of a construction embodying the present invention; Fig. 2 is a detail view of a series of cam devices for operating the clutches; Fig. 3 is a detail view of one of said cam devices mounted on the gear casing; Fig. 4 is a sectional elevation view taken substantially on the plane indicated by the line 4—4 of Fig. 1; Fig. 5 is a sectional elevation view showing the trains of gears; Fig. 6 is a view similar to Fig. 1, but showing a modification; Fig. 7 is a fragmentary sectional view as indicated by the section line 7—7 on Fig. 6.

The speed changing gears as herein shown are mounted in a casing K comprising a body portion 20 and end plates 21 and 22 removably secured to the body portion by bolts 23. The casing is preferably partly filled with a light oil 24 which serves to keep all of the gears within the casing and the clutch faces well lubricated. Extending longitudinally through the center of the casing is a drive shaft 25 which is journaled in the end plates 21 and 22. The power to be transmitted may be supplied from any suitable source, as for example, an internal combustion engine M, the drive shaft of which is connected by a coupling 26 to the drive shaft 25. Within the casing is a series of rotatable disks A, B, C, D, E and F. The disk A is keyed to the drive shaft, the remaining disks are loosely mounted on the shaft, and are adapted to be successively connected for rotation with the disk A and drive shaft, by means of a series of clutches.

The several clutches and the operating devices therefor are substantially alike in construction, so that a description of one will suffice for all. As shown in Figs. 1 and 4, each clutch comprises a clutch member or shoe 27, the outer face of which is adapted to frictionally engage the inner face of the casing K. The clutch shoe is formed also with an inner face adapted to frictionally engage the peripheral surface of one of the rotary disks. The clutch 27 is provided with guiding rods 28 extending radially inward. As shown in Fig. 4 each clutch member is provided with three of these rods, the central one of which extends through a lug 29 which may be formed integral with the rotary disk carrying the clutch member, as for example, the disk D. The outer rods 28 extend through lugs 29' which are preferably removably secured to the disk to permit the parts to be readily assembled. On each of the rods 28 is mounted a spring 30 which is compressed between a lug as 29 and a nut 31 threaded on the rod 28. The springs 30 act to draw the friction clutches inwardly into engagement with the rotary disks. The clutch members are provided with rearward extensions 60 which fit between corresponding extensions 61 formed on the rotary disks and which serve to take up lateral thrust between the disks and clutch members, thereby preventing lateral strain on the rods 28.

The clutch members 27 are drawn outwardly against the action of the springs 30 to frictionally connect them with the stationary casing K by means of clutch operating rings 32. The latter are provided with inclined faces engaging the correspondingly inclined faces formed on the clutch members, so that as each clutch ring 32 is moved to the left, the clutch members coöperating therewith are forced outwardly into frictional contact with the stationary casing. As each ring 32 is moved to the right the clutch members coöperating therewith are released from the casing, and drawn into engagement with the rotary disk by means of springs 30. Each of the clutch operating rings 32 is provided with pins 33 extending outward through openings 34' formed in the casing. Pivotally mounted on the casing A by means of pivot pins 41 are cam disks 34, see Fig. 2, there being a set of these disks on each side of the casing. The disks 34 are formed with a series of cam grooves a, b, c, d and e. Levers 35 are pivoted on lugs or pins 36 secured to the casing. The outer end of each lever 35 is provided with a cam roller 37 engaging one of the cam grooves in the disks 34. On each of the pins 36 is also mounted a short rock arm 38 which is yieldingly held in alinement with the lever 35 by means of centering springs 39, between the rock arm 38 and lugs 40, formed on the lever 35. The outer ends of the arms 38 are provided with openings through which the pins 33 extend. Each of the disks 34 is provided with an arm or extension 42 having pivotal connection at its outer end with a rod 43. The rods 43 are connected through links 43' to the outer ends of a yoke 44 which, as indicated in Fig. 1, is mounted on the drive shaft 25 so as to be movable longitudinally thereof. The yoke 44 is operated by a bell-crank lever 45 pivoted at 46 to a bracket 47 secured to the gear casing. A locking latch 49 coöperates in the usual way with a rack 48 formed on the bracket, so that the yoke 44 may be locked in any position to which it is moved by means of the handle 50 on the operating lever.

A train of gears numbered from 1 to 16, see Fig. 5, comprises a gear 1 formed on the hub of the disk B, gears 2 and 3 keyed to a stud shaft 51 journaled in the disk C, gears 4 and 5 formed in one piece and loosely mounted on the drive shaft, gears 6 and 7 keyed to a stud shaft journaled in the disk D, gears 8 and 9 journaled on the drive shaft 25, gears 10 and 11 carried by the disk E, gears 12 and 13 mounted on the drive shaft, gears 14 and 15 carried by the disk F, and a gear 16 loosely mounted on the drive shaft. The gear 16 is provided with a hub or sleeve 52, extended through the end plate 21 of the casing and journaled therein. Keyed to this sleeve 52, at its outer end, is a sprocket wheel 17 through which the power is transmitted to the driven mechanism. The gears 1 to 16 are permanently in mesh with each other as clearly shown in Fig. 5. The gears such as 2 and 3 which are carried by the disks are duplicated on the opposite side of the drive shaft in order to form a more symmetrical and stronger construction; although the principle of operation will obviously be the same whether only one or more than 1 set of these gears is used.

The operation of the mechanism thus far described is substantially as follows: With the parts in the position shown, the clutch shoes 27 are all in frictional engagement with the stationary casing so that the disks B, C, D, E and F are held stationary. Assuming that the prime mover M is running at a constant speed, the drive shaft 25 and disk A will be rotated, but no power will be transmitted to the driven member 17. If now the operating lever be moved downward to engage the latch 49 with the next lower notch in the quadrant, the yoke 44 and rods 43 will be moved to the left and rotate all of the cam disks 34 through a small angle. This rotation of the first disk will be sufficient to carry the cam lever in the cam slot a inward along the incline portion 53, thereby swinging the levers 35 and 38 as a unit about their pivot 36, thus moving the right hand clutch operating ring 32 to the right. This disengages the clutch shoes 37 carried by the disk B, so that said shoes are released from the stationary casing K and frictionally engage the rotating disk A; thereby causing the disk B to rotate with the drive shaft. As the gear 1 now rotates with the drive shaft, the motion is transmitted through the train of gears 1 to 16, so that the driven member 17 is rotated. The speed of the latter is much less than that of the drive shaft owing to the relative sizes of the several gears. In the initial movement of the operating lever, only the first lever 35 of the series was operated, as the cam rollers 37 in the cam slots b, c, d, and e remain stationary, being in engagement with the portions of the cam slots concentric with the pivots of the cam disks. When the operating lever is moved downward another notch, the second disk operates to release the clutch shoes carried by the disk C, so that the latter is connected for rotation with the disk B. As the disks B and C are now rotating together the gear 2 is locked against rotation about its own axis thereby also locking the gear 3 so that the member comprising the gears 4 and 5 is carried with the disk C; or, in other words, the gear 5 is now rotating at the same speed as the drive shaft 25. The motion is transmitted from the gear 5 to the driven member as before, but as the gear 5 is rotating at a higher speed than when the power is transmitted through the gears 2 and 3 rotating about a stationary axis, the speed of the driven member is correspondingly increased. As the operating lever is moved farther down, the remaining cam disks operate in like manner to successively connect the disks D, E and F for rotation with the drive shaft, causing a gradual increase in the speed of the driven member. When all of these disks are thus connected for rotation as a unit, the speed of the driven member 17 will obviously be the same as that of the drive shaft. By moving the operating lever back toward initial position, the operations just described will be reversed and the speed of the driven mechanism gradually reduced. Any desired intermediate speed may be obtained by locking the operating lever in a corresponding position.

Figs. 6 and 7 illustrate a modification, in which the rotary disks A', B', C', D', E' and F' are movable into direct frictional contact with each other, or with the gear casing, instead of being connected through the medium of the clutch shoes. Each of these disks except the disk A' has formed in its peripheral face an annular recess 63. In each of these recesses are arc-shaped operating members 64, provided with anti-friction rollers 65. Each of the members 64 is provided with a pin 33' extending through the casing and connected to an operating lever 38, the same as described in connection with Figs. 1 to 4. When the lever 38 is operated to move the members 64 in the disk B' to the right, said disk is carried to the right and the inclined face of the annular flange 66 on said disk frictionally engages the disk A'. At the same time the flange 67 also formed on the disk B', is carried out of frictional contact with the gear casing, so that the disk B' may rotate with the driving disk A'. The disks C', D', E' and F' are in a similar manner disconnected from the casing and connected for rotation with the drive shaft, the operation being like that already described.

Various modifications in the details of construction and arrangements of parts might be made within the spirit and scope of the present invention, and I wish therefore not to be limited to the particular constructions disclosed.

What I claim as new and desire to secure by Letters Patent of the United States is.

1. The combination with a drive shaft, of disks loosely mounted thereon, gears mounted on the drive shaft between said disks, gears carried by said disks and coöperating with said first-named gears, and mechanical means for successively connecting said disks for rotation with the drive shaft.

2. In power transmitting mechanism, the combination with a driving element and a driven element, of a plurality of members mounted on the driving element and rotatable about the axis of the driving element, mechanically operated means for holding said members against rotation, means for successively releasing said members and connecting them for rotation with the driving element, and power transmitting devices interposed between said members.

3. In power transmitting mechanism, the combination with a rotary driving element and a rotary driven element having the same axis of rotation, a series of members mounted on one of said elements and independently rotatable about said axis, gearing connecting said members and said elements, and mechanically controlled means for successively connecting said members for rotation with the driving element as a unit.

4. In power transmitting mechanism, the combination with a stationary casing, of a plurality of disks rotatable within the casing, clutches carried by said disks and movable into engagement with the casing, mechanical means for successively operating said clutches into such position, and gearing connecting said disks.

5. The combination with a casing, of a plurality of members rotatable within the casing, clutches carried by said members and movable into frictional engagement with the casing, power transmitting gears coöperating with said members, and means for manually operating the clutches.

6. The combination with a casing, of a plurality of members rotatable within the casing, clutches carried by said members and movable into frictional engagement with the casing, power transmitting gears coöperating with said members, and mechanical means for moving the clutches into and out of engagement with the casing.

7. The combination with a casing, of variable speed and power transmission mechanism within the casing and comprising a plurality of intermeshed gears and a plurality of rotary carrying members, clutches operable to frictionally engage said members either with the casing or with each other, and mechanical means for effecting such operation and thereby varying the speed and power transmitted.

8. In variable speed and power transmission apparatus, the combination with a drive shaft, of a plurality of disks mounted thereon, gears carried by the disks, other gears mounted on the shaft and intermeshing with said first named gears, a driving connection between said shaft and gears, mechanical devices for holding said disks against rotation, and mechanical means to successively release the disks and connect them with each other to vary the speed transmitted.

9. In variable speed and power transmission mechanism, the combination of a rotary drive shaft, a member keyed to the shaft, a plurality of members loosely mounted on the shaft, gears carried by said last named members, gears loosely mounted on the shaft and intermeshed with the first named gears, mechanical means to hold said loosely mounted members stationary and permit the drive shaft to run idle, and mechanical means to successively release said loosely mounted members from their stationary positions and connect them to said first named member for rotation with the drive shaft.

10. In power transmitting mechanism, the combination of a drive shaft, disks loosely mounted thereon, gears mounted on the drive shaft between the disks, gears carried by the disks and coöperating with said first-named gears, a series of clutches controlling the rotation of said disks, cams for operating the clutches, and elastic connections between the cams and clutches.

11. In power transmitting mechanism, the combination of a drive shaft, a series of rotary members loosely mounted thereon, gears mounted on the drive shaft between the said rotary members, gears carried by said rotary members and coöperating with said first-named gears, clutches carried by said members, clutch operating devices, said clutches and clutch operating devices having coöperating faces inclined to their direction of movement, and means for successively actuating the said clutch operating devices.

12. In power transmitting mechanism, the combination of a plurality of rotary members, means to form driving connections between said members, clutches carried by said members, clutch operating rings movable toward and from said members, and means for successively operating said rings to effect a successive operation of the clutches.

13. In power transmitting mechanism, the combination of a series of rotary members, power transmitting means between said members, clutch shoes carried by said members, stationary means with which said clutch shoes are adapted to engage, clutch operating members formed with cam faces, said clutch shoes being formed with coöperating cam faces, and means for operating said members and thereby moving the clutch shoes into or out of engagement with said stationary means.

14. In power transmitting mechanism, the combination with a series of rotary members, intermediate gearing, a casing inclosing said members, clutch shoes carred by said members and movable into and out of frictional contact with the casing, clutch rings formed with cam surfaces adapted to operate the clutch shoes, and means for moving the clutch rings laterally and thereby operating clutch shoes.

15. In power transmitting mechanism, the combination of a drive shaft, a plurality of rotary members mounted on said shaft, gearing forming driving connections between said members, a casing inclosing said members and provided with openings therein, clutch shoes carried by said members, each of said clutch shoes being movable in one direction into frictional contact with the casing and in the opposite direction into frictional contact with one of said members, clutch operating members comprising stems extending through said openings in the casing, and means carried by the casing and connected to said stems for successively actuating said clutch operating members and thereby effecting a successive operation of the clutches.

16. In power transmitting mechanism, the combination of a plurality of rotary members, power transmitting means between said members, a casing inclosing said members and formed with openings therein, clutch shoes carried by said members and provided with extensions projecting through said openings, levers mounted on the casing and connected to said extensions, and means for successively operating said levers and thereby effecting a successive operation of the clutches.

17. In combination, a plurality of power transmitting members, power transmitting means between said members, clutches carried by said members, clutch operating levers, a plurality of disks formed with cam slots for operating said levers, and an operating device connected to said disks, said cam slots being so formed as to effect a successive operation of the levers when said device is operated.

18. In power transmitting mechanism, the combination of a casing, power transmitting members within the casing, gearing between said members, clutch devices associated with said members, a series of cam disks mounted on the casing, elastic connections between said disks and the clutch devices for operating the latter, and means for operating the cam disks.

19. In power transmitting mechanism, the combination with a drive shaft, of a plurality of rotary disks mounted on the drive shaft, power transmitting means between the disks, a casing inclosing said disks, clutch mechanism associated with said disks, clutch operating devices mounted on the casing and connected to said clutch mechanism, a yoke loosely mounted on the drive shaft externally of the casing, connections between said yoke and the clutch operating devices, and means for moving the yoke longitudinally of the drive shaft and thereby effecting the operation of the clutches.

In testimony whereof, I have signed my name to this specification in the presence of two subscribing witnesses.

AUGUST SUNDH.

Witnesses:
JAMES G. BETHELL,
WALTER C. STRANG.